United States Patent [19]

Fukuoka et al.

[11] 4,235,481
[45] Nov. 25, 1980

[54] BEARING DEVICE FOR INTERNAL COMBUSTION ENGINE

[75] Inventors: Tatsuhiko Fukuoka, Toyota; Akira Sakai, Toki; Yoshimi Matsuda, Toyota, all of Japan

[73] Assignee: Taiho Kogyo Co., Ltd., Toyota, Japan

[21] Appl. No.: 959,255

[22] Filed: Nov. 9, 1978

[30] Foreign Application Priority Data

| Nov. 16, 1977 | [JP] | Japan | 52-137595 |
| May 19, 1978 | [JP] | Japan | 53-59781 |
| Jun. 2, 1978 | [JP] | Japan | 53-66519 |
| Jun. 30, 1978 | [JP] | Japan | 53-80260 |

[51] Int. Cl.³ .............................. F16C 9/02; F16C 9/04
[52] U.S. Cl. ...................................... 308/23; 308/122; 308/240
[58] Field of Search ............ 308/23, 122, 167, 237 R, 308/240

[56] References Cited

U.S. PATENT DOCUMENTS

| 1,114,554 | 10/1914 | Utz | 308/23 |
| 1,282,672 | 10/1918 | Blumberg | 308/23 |
| 1,355,706 | 10/1920 | Snyder | 308/23 |
| 1,511,672 | 10/1924 | Kirkham | 308/23 |
| 4,073,550 | 2/1978 | Yahraus | 308/167 |

FOREIGN PATENT DOCUMENTS

| 17588 | 10/1956 | Fed. Rep. of Germany | 308/23 |
| 1243753 | 9/1969 | France | 308/122 |

Primary Examiner—Richard R. Stearns
Attorney, Agent, or Firm—Blanchard, Flynn, Thiel, Boutell & Tanis

[57] ABSTRACT

A bearing device for an internal combustion engine in which device the friction loss is reduced by varying the diametrical clearances of crankshaft bearings supporting the crankshaft, in accordance with the intensities of the impact loads exerted thereon. The friction loss is further reduced, if desired, by enlarging the oil reliefs of the crankshaft bearings and/or the connecting rod bearings. The unbalance of lubricant oil supply that is caused by the variation of the clearances and the enlargement of the oil reliefs can be avoided by regulating the positions of the lubricant oil grooves of the bearings and the positions of the clicks for the position setting of the bearings.

18 Claims, 16 Drawing Figures

BEARING DEVICE FOR INTERNAL COMBUSTION ENGINE

BACKGROUND OF THE INVENTION (1) Field of the Invention

This invention relates to a bearing device for use in an internal combustion engine. More particularly, the invention relates to an improved bearing device for an internal combustion engine in which the friction loss of sliding bearings such as crankshaft bearings and connecting rod bearings, that is, the friction loss which is caused to occur around the crankshaft, can be reduced. With the reduction of the friction loss, the needless increase of lubricant oil, the resultant decrease of oil supply to other sliding surfaces and the lowering of oil pressure can well be avoided.

(2) Description of the Prior Art

In order to reduce the friction loss around crankshafts, it is necessary to decrease the friction loss in the bearings that support the crankshafts. Further, it is considered more desirable that the friction loss caused in the connecting rod bearings which are disposed between the crankshaft and the connecting rod ends, is also decreased. However, when viewed from the relation between the friction loss and the clearances of crankshaft bearings, the clearances of sliding bearings for supporting the crankshaft of an internal combustion engine were all set at a constant value in the prior art. The dimension of the clearance was made larger than a certain value so as to avoid seizure between the crankshaft and the sliding bearings, while it was made smaller than the value with which any impact sounds caused by the collision of the crankshaft with sliding bearings were not produced. Such value was determined by experiments. That is, for the purpose of reducing the friction loss, it is desirable that the clearance is set at a value as large as possible. However, when the value of the clearance is set too large, the crankshaft collides violently with the sliding bearings. In other words, the sliding bearings receive impact loads and produce noises. Therefore, the reduction of friction loss had its limit in the conventional art.

Meanwhile, oil reliefs are generally provided in crankshaft bearings and connecting rod bearings, and it is considered that the enlargement of such oil reliefs contributes to the reduction of friction loss in each bearing. However, in the conventional art, the oil reliefs are formed for the purposes of promoting and ensuring the oil circulation. Therefore, the dimension of the oil relief was made about 5 to 15 μm for a crankshaft of 30 to 70 mm in diameter. Such value was considered to be sufficient for the above object. Further, it was believed in the conventional art that, if the dimension of the oil relief is made larger than the above value, the shaft has unnecessary play so that the performance the bearing is affected adversely. Accordingly, it has never been tried to reconsider the set value of the oil relief in order to reduce the friction loss of bearings.

BRIEF SUMMARY OF THE INVENTION

The inventors of the present application have carried out wide and extensive investigations in connection with the reduction of friction loss that is caused to occur in crankshaft bearings and connecting rod bearings. As the result, they have taken notice of the fact that the intensities of impact loads exerted on the crankshaft bearings from the crankshaft are different from each other in a multi-cylinder internal combustion engine in which the crankshaft is supported by three or more sliding bearings. Therefore, in the sliding bearings which receive large impact loads and produce large noises, the clearances are made small just like those in the conventional art, while, in the case of the bearings which receive rather small or almost no impact loads, the clearances may be made as large as possible in accordance with the intensities of the exerted impact loads. Thus, as compared with the conventional bearings, the friction losses can be much reduced without producing the undesirable noises.

In addition to the above-described enlargement of clearances according to the intensities of impact loads, it has been further found that the reduction of friction loss in crankshaft bearings can also be attained by enlarging the oil reliefs as compared with those in the conventional art. Meanwhile, in the connecting rod bearings, the clearances between the bearings and crankpins cannot be enlarged because the impact loads applied to the connecting rod bearings are almost the same. However, it has been found that the friction loss can be reduced by enlarging the oil reliefs as compared with those in the conventional art.

However, in the case that some clearances and oil reliefs of crankshaft bearings and the oil reliefs of connecting rod bearings are enlarged, the necessary quantity of lubricant oil becomes too much in the sliding bearings having enlarged clearances and oil reliefs. As the result, the balance of oil supply in the entirety of the internal combustion engine is lost and the lack of oil supply to other sliding portions such as cam shaft bearings and so forth becomes a problem. That is, when the clearances and oil reliefs are enlarged in the crankshaft bearings and the oil reliefs are enlarged in the connecting rod bearings, the interspaces between shafts and bearing surfaces become large and the flow resistances in the interspaces become small, while, in the internal combustion engine, the lubricant oil is supplied at a predetermined pressure by an oil pump of a predetermined capacity. Therefore, the above crankshaft bearings and connecting rod bearings are supplied with an excessively large quantity of lubricant oil and the oil is directly returned to the oil pan through the end portions of the above bearings (lateral leakage). Owing to the above fact, the quantity of oil which lubricates several other engine parts by passing through the normal oil circuit and returning into the oil pan is decreased and the balance of oil supply to other sliding portions (cam shafts and so forth) is lost. Therefore, a lack of lubricant oil is caused to occur in some sliding portions, which often results in the occurrence of abnormal wearing and seizure.

It is, therefore, the primary object of the present invention to provide an improved bearing device, especially crankshaft bearings, for an internal combustion engine which device has low friction loss.

Another object of the present invention is to provide a sliding bearing which is provided with a clearance just like the conventional ones when the bearing receives large impact loads and is liable to produces large noises, while when it receives small or almost no impact load, the clearance is made as large as possible, thereby reducing the friction loss without producing noises. This fact depends upon the consideration that the intensities of impact loads exerted on sliding bearings through the crankshaft are different from each other in a multi-cylinder internal combustion engine in which the crankshaft is supported by three or more sliding bearings.

A further object of the present invention is to provide a bearing device for an internal combustion engine, in which device the friction loss is made lower without causing the problem of noises and the lowering of performance, by enlarging the oil reliefs of the crankshaft bearings and/or the connecting rod bearings in addition to the above-mentioned enlargement of the clearances. This depends upon a new consideration to oil reliefs in view of the reduction of the friction loss, which is quite different from the ordinary consideration of the oil circulation.

Still a further object of the present invention is to provide a bearing device for an internal combustion engine, which device prevents the occurrence of imbalance in the supply of lubricant oil caused by varying the above-mentioned clearances and enlarging the oil reliefs. In other words, the unnecessary increase of oil supply to the sliding bearings caused by the enlargement of clearances and oil reliefs and resultant lack of oil supply to other sliding portions and the lowering of oil pressure are successfully avoided.

BRIEF DESCRIPTION OF THE DRAWINGS

These and other objects and features of the invention will become more apparent from the following description taken in connection with the accompanying drawings in which.

DESCRIPTION OF THE PREFERRED EMBODIMENTS

In the following, several embodiments of the present invention will be described with reference to the accompanying drawings.

In the first place, the embodiment of sliding bearings and the effect of reducing the friction loss thereof will be described. In this embodiment, the clearance between a crankshaft and the bearing surface is varied according to the intensity of impact loads exerted thereto.

Figure 1:
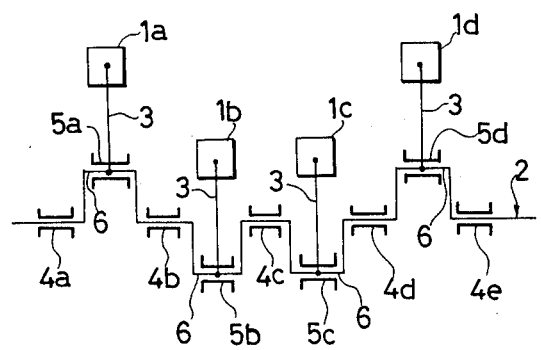
FIG. 1 is a schematic illustratiion of a four cylinder series type internal combustion engine.

FIG. 1 schematically shows an internal combustion engine of the series type, in which the reference numerals 1a, 1b, 1c and 1d denote pistons, the numeral 2 denotes a crankshaft, the numeral 3 denotes each connecting rod which connects a piston and the crankshaft 2, and the numerals 4a, 4b, 4c, 4d and 4e denote five crankshaft bearings which support the crankshaft 2 on the main body (not shown) of the internal combustion engine. Connecting rod bearings 5a, 5b, 5c and 5d are disposed in the joint portions between the respective connecting rods 3 and crankpins 6 of the crankshaft 2. Each of these crankshaft bearings and connecting rod bearings is composed of a pair of cross-sectionally semi-circular sliding bearings.

Figure 2A:
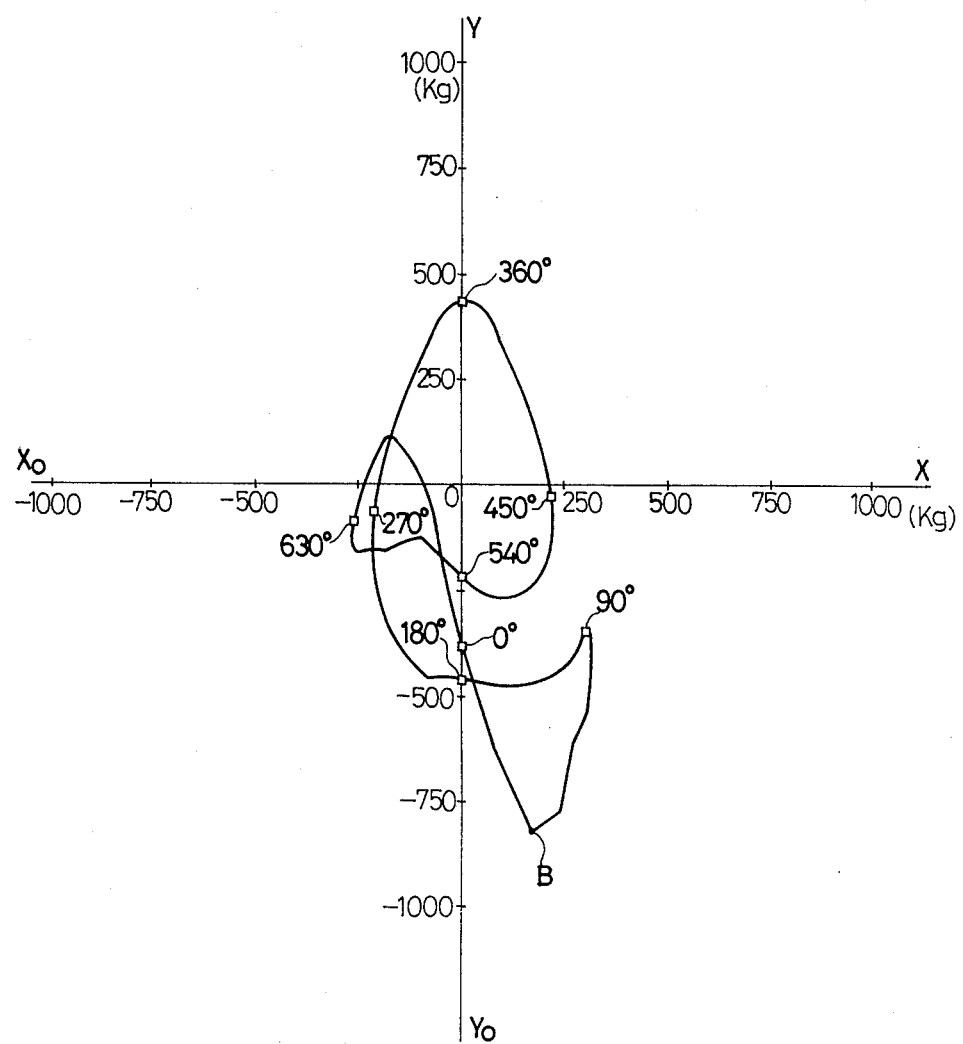
FIGS. 2 (a), (b) and (c) are diagrams showing the variation of loads exerted to sliding bearings 4a, 4b and 4c, respectively.
Figure 2B:
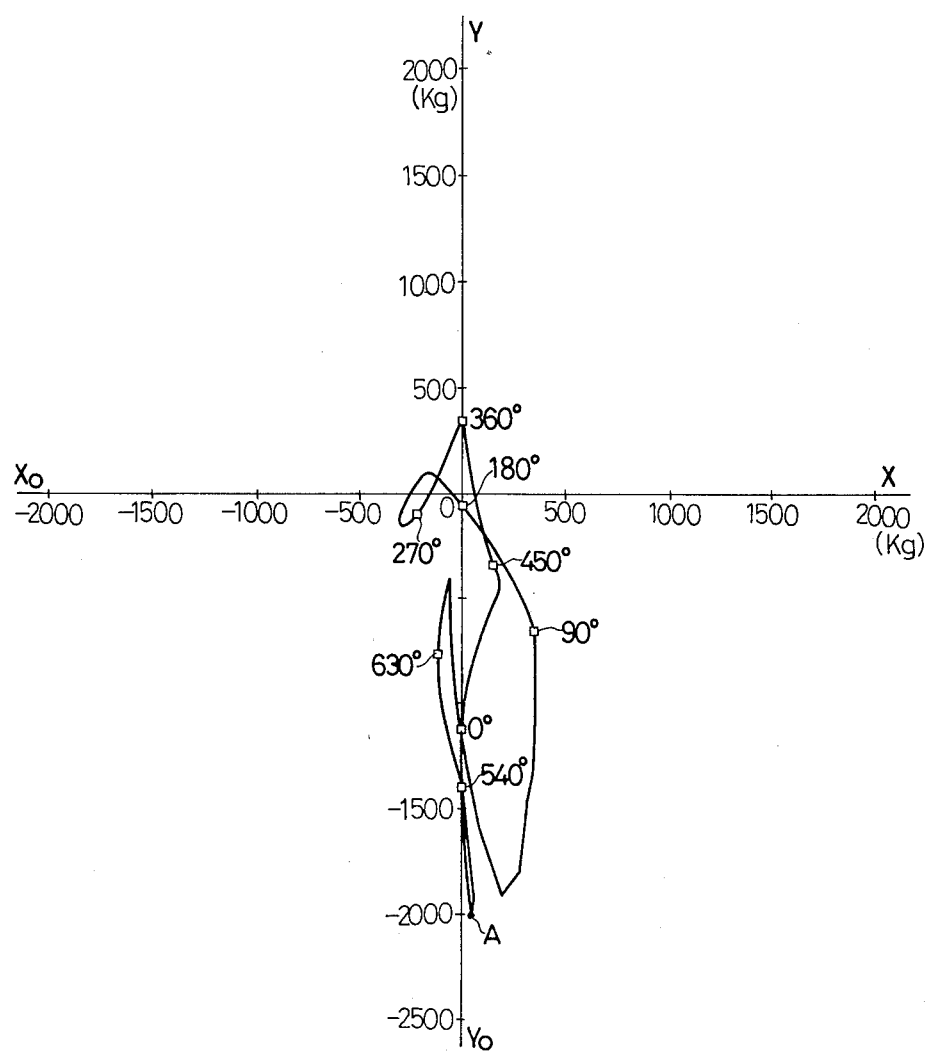
Figure 2C:
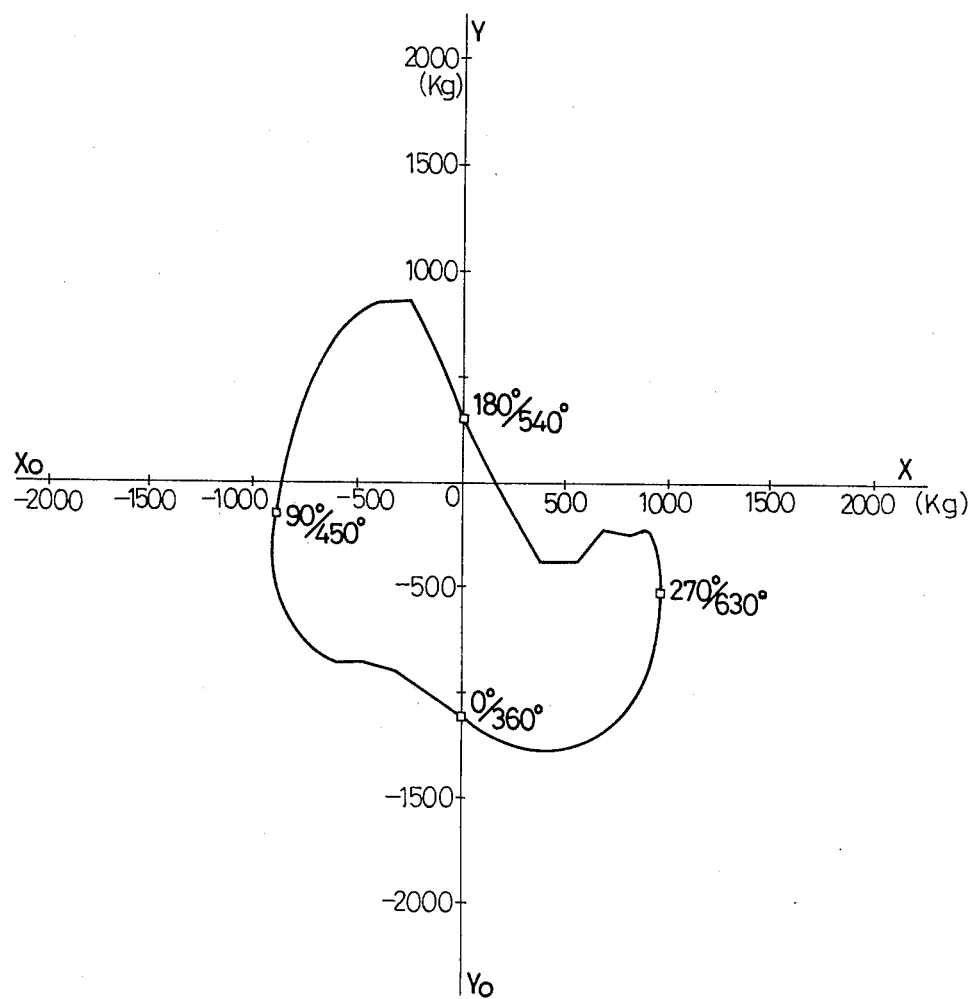

FIG. 2 (a) to FIG. 2 (c) show the calculated results of the variation of loads exerted on the respective crankshaft bearings at 4200 rpm in a series four cylinder internal combustion engine shown in FIG. 1. FIG. 2 (a) shows the result on the crankshaft bearing 4a, FIG. 2 (b) shows the result on the crankshaft bearing 4b and FIG. 2 (c) shows the result on the crankshaft bearing 4c. The crankshaft bearings 4d and 4e and the crankshaft bearings 4b and 4a are disposed symmetrically about the center of the crankshaft bearing 4c, therefore, if the rotational phase of the crankshaft is shifted by 360° in an indicated state of the crankshaft bearing 4b, the result becomes the same as the state of the crankshaft bearing 4d. The same consideration may be applied to the relation between the crankshaft bearings 4e and 4a. Accordingly, the description with regard to the crankshaft bearings 4d and 4e will be omitted.

Figure 3:
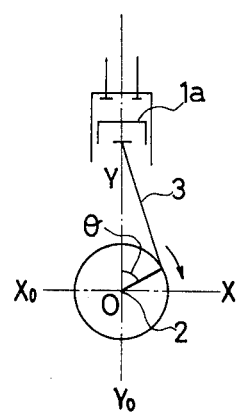
FIG. 3 is an explanatory drawing for illustrating the starting point of the rotation angle of a crankshaft.

FIG. 3 shows the state of variation of loads exerted to a bearing in one cycle of a four-stroke cycle engine, in which the parameter is the angle of rotation ($\theta$) of the crankshaft 2. In a four-stroke cycle engine, one cycle is completed by two rotations of the crankshaft 2, so that the angle of rotation ($\theta$) is indicated up to 720°. The angle of rotation of 0° means that the piston 1a is at the top dead center position in an explosion stroke. The ignitions are caused to occur in the order of pistons 1a - 1c - 1d - 1b. In these diagrams, the directions and intensities of loads are represented by vectors and the closed curves are formed by combining the ends of vectors. The coordinate axes $X$-$X_o$ and $Y$-$Y_o$ are fixed relative to crankshaft bearings.

The results shown in FIGS. 2 (a), (b) and (c) are compared with each other in the following. As indicated by the point A in FIG. 2 (b), it is understood that the crankshaft bearing 4b corresponding to FIG. 2 (b), and accordingly also the crankshaft bearing 4d, receive large impact loads of about 2000 kg. Meanwhile, the crankshaft bearing 4c corresponding to FIG. 2 (c) does not receive such an extreme impact load like the foregoing point A. That is, since the characteristic curve in FIG. 2 (c) is a gentle closed curve, the impact load is hardly exerted to the crankshaft bearing 4c. Further, with regard to the crankshaft bearing 4a corresponding to FIG. 2 (a), accordingly also the crankshaft bearing 4e, they receive impact loads as shown by the point B in the same figure. However, the impact loads are as small as about 800 Kg as compared with the load that is indicated by the above-mentioned point A. In addition, the closed curve at the point B is less acute as compared with the curve at the above-mentioned point A.

Therefore, with regard to the crankshaft bearings 4b and 4d receiving large impact loads, the crankshaft bearings 4a and 4e receiving small impact loads, and the crankshaft bearing 4c receiving almost no impact load, when the clearances are determined as large as possible within the ranges in which they do not produce noises, according to their applied impact loads that are obtained from the calculated results shown in FIGS. 2 (a) to 2 (c), the friction loss of the bearings can be largely reduced as compared with those of the conventional art without causing undesirable noise.

As described above, the clearances of the two crankshaft bearings 4b and 4d are made smallest in view of the above-mentioned patterns of loads and the clearances of other crankshaft bearings 4a, 4c and 4e can be made larger. Therefore, in view of the fact that the accurate alignment of all the crankshaft bearings is quite difficult in the present status of the art, when the positioning of the crankshaft is done by means of the crankshaft bearings 4b and 4d, small misalignment in other crankshaft bearings 4a, 4c and 4e may be allowed to some extent by the larger clearances of them. Accordingly, the effect as the countermeasure to such misalignment can also be expected.

Further, in order to vary the clearances, two kinds of methods can be employed. In one method, the diameter of the crankshaft is made constant and the thicknesses of the crankshaft bearings are varied. In the other method, the thicknesses of the bearings are made constant and the diameters of the crankshaft portions are varied.

The clearances of the crankshaft bearings are described in the above paragraphs. Now in the following, the oil reliefs will be described in detail.

As the result of the variation in the clearances according to the intensities of impact loads exerted on the crankshaft bearings, the friction losses, especially those of the bearings which receive relatively small impact loads, can be reduced. The formation of oil reliefs of the present invention assists and cooperates with the above-described variation in the clearances and further reduces the friction loss. Still further, the provision of oil reliefs also reduces the friction loss of the connecting rod bearings 5a to 5d in FIG. 1. In the case of connecting rod bearings, the impact loads which are exerted to them in the explosion cycle of an internal combustion engine are not varied among them. Accordingly, it is impossible to carry out the setting of the clearances of the connecting rod bearings just like the above-mentioned crankshaft bearings. However, the friction loss of the connecting rods can be reduced by enlarging the oil reliefs. Therefore, the friction loss about the crankshaft can be further reduced.

Figure 4:
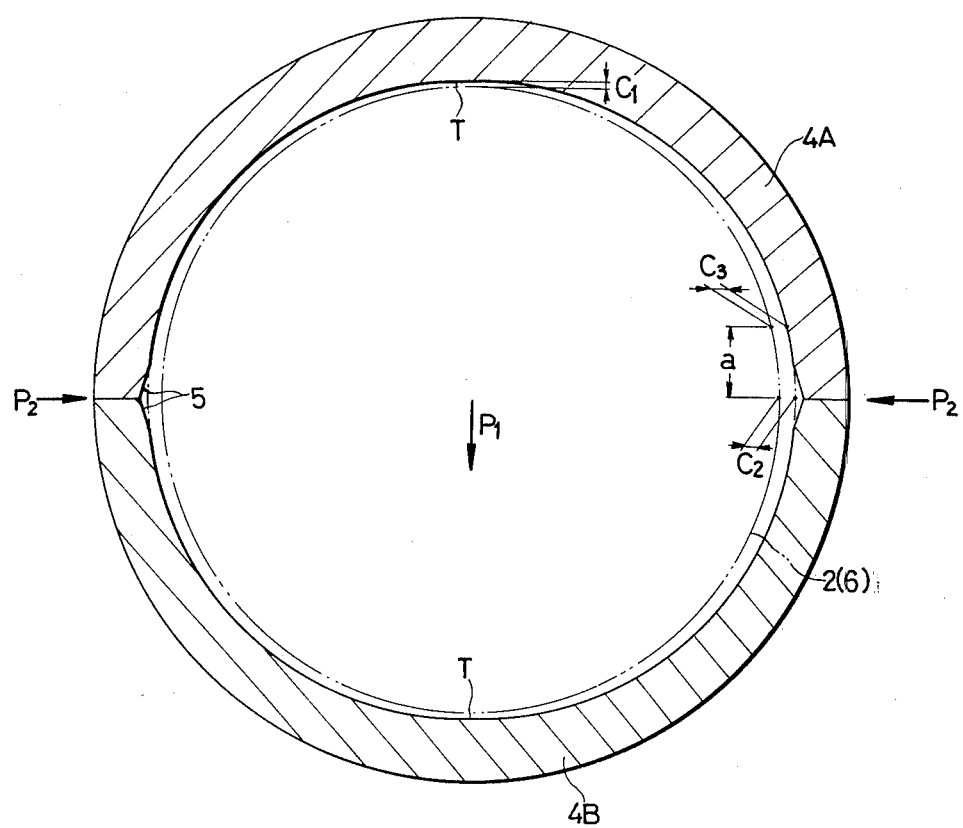
FIG. 4 is an enlarged and exaggerated cross-sectional view of a sliding bearing showing the shapes of sliding surfaces for the illustration of oil reliefs.

In FIG. 4, the configurations of the sliding surfaces are shown in an enlarged and exaggerated cross-sectional view in order to illustrate the oil reliefs. A pair of split semicircular sliding bearing halves 4A and 4B define a bearing that supports a main portion of the crankshaft 2 or a crankpin 6. The central crowns T of the sliding surfaces of both the sliding bearing halves 4A and 4B approach the shaft 2 and the sliding surfaces are gradually separated from the shaft 2 along their circumferences to their end portions. In other words, when the cross-section of the shaft 2 or 6 is assumed to be a perfect circle, the clearances formed between the shaft surface and the sliding surfaces of sliding bearing halves 4A and 4B become gradually larger from the minimum clearance $C_1$ at the central crown T to the maximum clearance $C_2$ at the end portions. When the clearances are gradually enlarged in like manner as the above, the difference between the maximum clearance and the minimum clearance is called the "oil relief". This value equals the maximum depth in cutting when the oil relief is defined by first forming a perfectly circular sliding surface and then shaving the sliding surface other than the central crown portion T. By the way, since crush reliefs 5 are formed at the end portions of the sliding bearing halves 4A and 4B as the reliefs in the assembling of them, the above maximum shaving depth or the maximum clearance is sometimes measured at a distance a of 6 to 10 mm away from the circumferential end.

The objects of the above-mentioned provision of the oil reliefs are to promote and to ensure the circulation of oil. That is, when the clearances are gradually enlarged on both sides of minimum clearance $C_1$ at the central crown T, the oil circulation on the sliding surfaces is increased, and accordingly, the cooling effect can be enhanced. Further, in the case that the shaft 2 or 6 is applied with a high load in the direction of the arrow $P_1$ or the assembled sliding bearing halves 4A and 4B are applied with the loads in the directions of $P_2$, the sliding bearing halves 4A and 4B are slightly deformed into a vertically long ellipse. However, such a deformation can be avoided by the provision of the oil relief. Therefore the minimum circulation of oil can be maintained.

As mentioned above, the values of oil reliefs in the conventional art were 5 to 15 $\mu$m for shafts of 30 to 70 mm in diameter. Such values have been considered to be necessary but sufficient, and it has been believed that, when such values are increased, the performances of the bearings are impeded owing to the formation of unnecessary plays in the bearings.

In the present invention, the oil reliefs were considered from a quite novel viewpoint of the reduction of friction loss in crankshaft bearings and/or connecting rod bearings, which viewpoint is different from the viewpoint of oil circulation. As the result, it has been found that the friction loss is reduced by enlarging the values of the oil reliefs without giving any undesirable influences, such as the occurrence of noises, to the performances of bearings.

The enlargement of oil reliefs should be effected at least to the crankshaft bearings which have relatively small clearances with the crankshaft. As compared with the crankshaft bearings having large clearances, the friction loss is large in the crankshaft bearings having small clearances. Accordingly, the friction loss can be reduced by the enlargement of the oil reliefs. While, with regard to the crankshaft bearings having relatively large clearances, a further reduction of the friction loss can be expected by the enlargement of the oil reliefs in addition to the enlargement of clearances. In this case, that is, when both the clearances and oil reliefs are enlarged, the degree of enlargement of the clearances is made somewhat smaller as compared with the case in which the oil reliefs are not enlarged, so as to avoid the occurrence of noises. Further, with regard to the connecting rod bearings, the oil reliefs may also be enlarged in substantially the same conditions.

A suitable value of the oil relief in the present invention to reduce the friction loss, that is, the difference between the clearance $C_1$ measured from the surface of the shaft 2 or 6 at the central crown T of the semicircular sliding bearing half 4A or 4B and the clearance $C_3$ measured at the point away from the end portion of the sliding bearing by a distance a of about 6 to 10 mm, may be in the range of 16 to 80 μm. This value must be determined on the basis of the factors of the number of rotation, exerted loads, shaft diameter and the above-mentioned clearance. In connection with the dimension of the shaft 2 or 6, the above value may be applied to a considerably wide range of the diameter of the shaft, and the above value may be sufficient for the crankshafts and crankpins (30 to 70 mmφ) of various types of the internal combustion engines. Especially, a quite marked effect can be expected in the water-cooled internal combustion engines for vehicles having the maximum number of rotation of about 6,000 rpm or so.

Through the above-described measures, the effect of the reduction of friction loss in the crankshaft bearings around the crankshaft can be obtained. However, when lubricant oil grooves and/or positioning clicks are formed in like manner as the conventional art, the quantity of the lubricant oil current is undesirably increased to reduce the oil pressure. Therefore, when the conventional lubricating system is employed, the balance of the oil supply in the entirety of the internal combustion engine is lost and the lack of oil supply in other sliding portions is caused to occur. This problem will be described in detail with reference to the accompanying drawings, FIGS. 5 and 6.

In the semicircular sliding bearing halves 4A and 4B, a lubricant oil groove 12 is formed in the sliding surface in the circumferential direction. The oil groove 12 is provided with an oil hole 13 through which lubricant oil is supplied. A positioning click 14 is formed protruding from one end portion of each outer surface of these sliding bearing halves 4A and 4B. The recess 15 is formed in the press work for forming the click 14.

The above-described sliding bearing halves 4A and 4B are fitted to the upper and lower sides of the shaft 2 or 6, and they are clamped together by the upper and lower housings 17, thereby supporting the bearing halves 4A and 4B at a predetermined location. In this assembling, the clicks 14 of the sliding bearing halves 4A and 4B are received in the recesses 18 of the housings 17 so as to locate the whole sliding bearing 4. The lubricant oil is supplied from an oil passage (not shown) of the housing 17 into the oil hole 13 and oil groove 12, and further into the space between the sliding surface and the shaft 2 or 6. With the continuous supply of the lubricant oil, several functions of the lubricant such as the reduction of friction loss, cooling and so forth can be fulfilled.

In the conventional sliding bearings (not shown), the positions of the above-mentioned click 14 and the lubricant oil groove 12 in the direction of the shaft are different, that is, the click is formed on one side end of the sliding bearing. Therefore, in the click portion, large clearances of the oil groove and recess are formed at two points in the direction of the shaft. As the result, the resistance of the oil passage in such portion becomes small, which results in an increase of the oil current and a decrease of oil pressure. Accordingly, when the clearance between the shaft is enlarged or the oil relief is additionally enlarged, the above inclination is promoted and the undesirable increase of oil flow and the lowering of oil pressure are caused to occur. In other words, when the clearances and oil reliefs are enlarged as above, the crankshaft bearings having enlarged clearances are supplied with excessive lubricant oil since the lubricant oil is supplied at a constant pressure by an oil pump of a predetermined capacity in an internal combustion engine. Therefore, the lubricant oil flows out through the end portions of bearings (lateral leakage) and it returns directly into the oil pan. Accordingly, the quantity of oil which passes through normal passages to other parts is decreased and the balance of oil supply to other sliding portions (cam shaft etc.) is lost. Therefore, the lack of oil supply is caused to occur in some sliding portions, which is liable to cause abnormal wearing and seizure.

Figure 5:
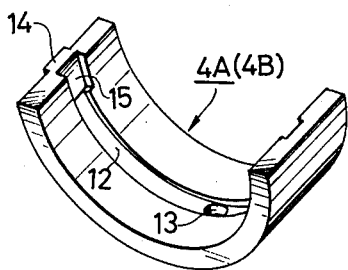
FIG. 5 is a perspective view of a sliding bearing showing the locational relation between a lubricant oil groove and a click as a detent means.
Figure 6:
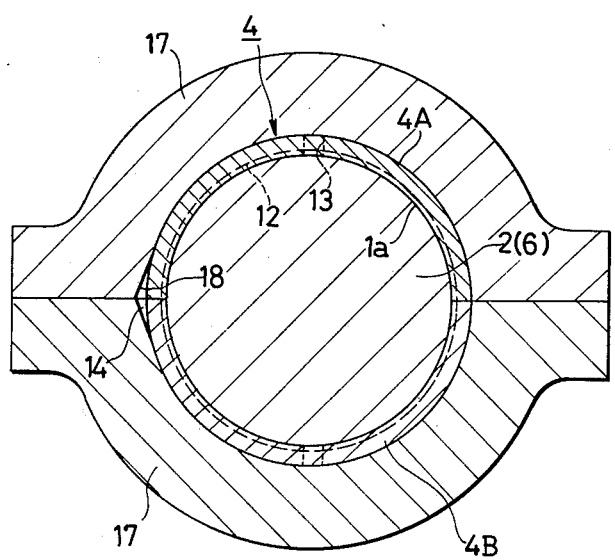
FIG. 6 is a cross-sectional view of an assembled sliding bearing which is formed by using the bearing members as shown in FIG. 5.

Therefore, in this embodiment, the positioning click 14 is formed on the backside of the oil groove 12 as clearly shown in FIG. 5. That is, the recess 15 is formed within the oil groove 12. Since the positions of the click 14 and the oil groove 12 are aligned, the large clearance portion becomes one point in the direction of the shaft. Accordingly, the flow resistance of the oil passage at the joining end portion of a split half of the sliding bearing can be made large as compared with that of the conventional ones. Therefore, it is effective for maintaining appropriate flow and pressure even when the clearances are made relatively large and the oil reliefs are also enlarged. That is, the reduction of friction loss can be attained without causing the unnecessary increase of oil flow and the decrease of pressure.

Figure 14:
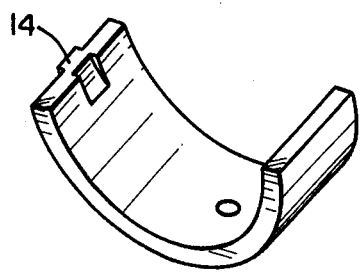
FIG. 14 is a perspective view of another embodiment of a sliding bearing for use in the bearing device of the present invention.

As will be understood from the above description, in order to prevent the lubricant oil from outflow (lateral leakage), it is desirable that the lubricant oil groove 12 and the recess 15 are formed at a position away from both sides of the sliding bearing as far as possible, that is, at the central part in the direction of the shaft. Even when the lubricant oil groove is formed at a position other than the central portion, the above-mentioned recess must also be formed in alignment with the lubricant oil groove. Further, when a plurality of oil grooves are formed, it will be apparent that the recess, that is, the click, is formed in alignment with one of the oil grooves. Furthermore, when no lubricant oil groove is formed, the click 14 may be formed at the central position in the direction of the shaft (FIG. 14).

Figure 7:
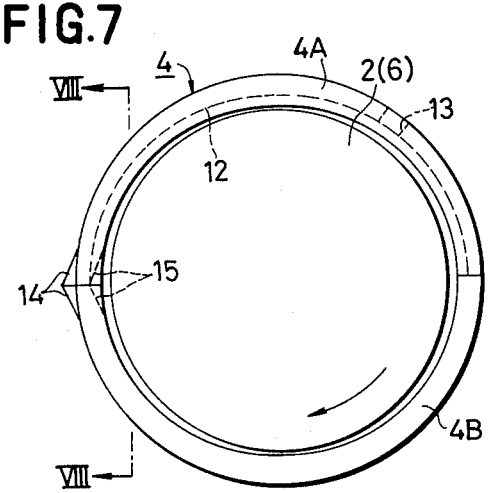
FIG. 7 is a schematic side view of another embodiment of a sliding bearing for use in the bearing device of the present invention.
Figure 8:
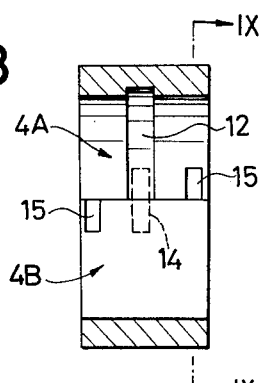
FIG. 8 is a cross-sectional view of a part of a sliding bearing taken on the line VIII—VIII in FIG. 7.
Figure 9:
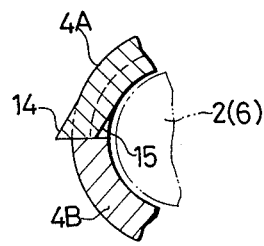
FIG. 9 is a cross sectional view of a part of a sliding bearing taken on the line IX—IX in FIG. 8.

In the sliding bearing shown in FIGS. 7 to 9, only one of the halves of the sliding bearing is provided with a lubricant oil groove and the click for positioning the bearing is disposed in like manner as the above or in another way. In this embodiment, the clearance is made relatively large and the oil relief is also made large so as to avoid the abovementioned disadvantage. One member of the pair of sliding bearing halves 4A and 4B that form a crankshaft bearing or a connecting rod bearing, is provided with a lubricant oil groove and the other member has a smooth sliding surface. In this case, the sliding bearing half 4A having the lubricant oil groove 12 is desirably on the side in which the explosion load of an internal combustion engine is not exerted. In the sliding bearing having the lubricant oil groove on only one side, the flow resistance of the side having no oil groove is large, therefore, the increase of oil current and the decrease of pressure that are caused by the enlargement of the clearance between the shaft, can well be avoided and the oil flow and pressure can be maintained at appropriate values. As shown in FIGS. 8 and 9, the click 14 may be disposed at an axial position different from that of the lubricant oil groove 12 or at the backside of the oil groove 12 as indicated by the dash lines in FIG. 8.

Figure 10:
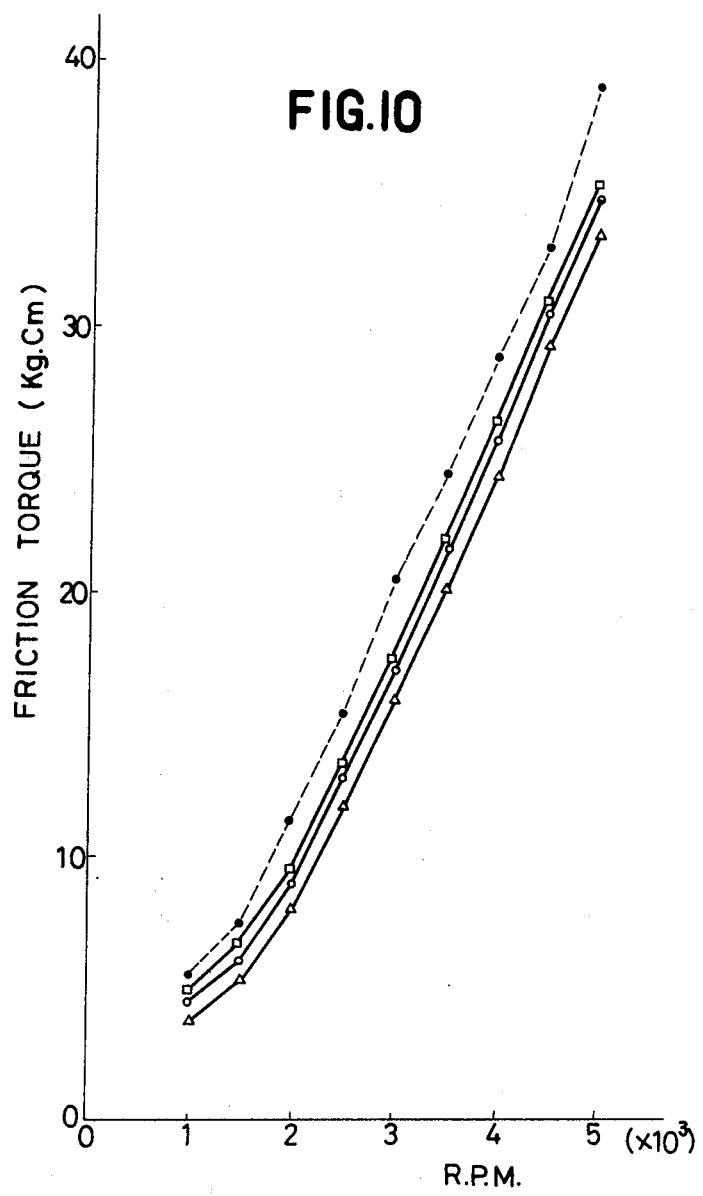
FIG. 10 is a diagram showing the results of friction torque tests for various bearings.

In the following, the present invention will be described further in detail with reference to several experimental results. The diagram in FIG. 10 shows the comparative results of the differences in friction torques about crankshafts with regard to a conventional device, a device of the present invention in which the clearances of the crankshaft bearings 4a to 4e are varied, a device of the invention in which the crankshaft bearing clearances are varied and the oil reliefs are simultaneously enlarged in the crankshaft bearings. The test conditions are shown in the following Table 1 and the symbols in FIG. 10 for the bearings are indicated in the following Table 2.

TABLE 1

| | |
|---|---|
| Type of engine | 4 cylinders, 1600 cc |
| | Diameter of crankshaft: 58 φ |
| Test device | Crankshaft + Unbalancing mass |
| | (Load patterns resemble to those of real machines) |
| Supplied oil temperature | 120 ± 2° C. |
| Oil quantity | 6 lit./min at 5000 rpm |
| | (Forced oil supply) |
| Kind of oil | SAE 10W-30 |

TABLE 2

| Symbol | Bearing | Oil clearance (μm) | Oil relief (μm) | Width of shaft (mm) |
|---|---|---|---|---|
| ● | Conventional | 35-45 | 10-15 | 20.8 |
| □ | This invention | 4a: 60<br>4b: 40<br>4c: 80<br>4d: 40<br>4e: 60 | 10-15 | 20.8 |
| ○ | This invention | 4a: 60<br>4b: 40<br>4c: 80<br>4d: 40<br>4e: 60 | 4a: 4c: 4e: } 10-15<br>4b: 4d: } 30-35 | 20.8 |
| Δ | This invention | 4a: 60<br>4b: 40<br>4c: 80<br>4d: 40<br>4e: 60 | 30-35 | 20.8 |

As will be understood from FIG. 10, the friction torques of the devices of the present invention are smaller than those of the conventional device, in other words, the friction loss can be reduced in the device of the present invention. In addition, the occurrence of noises was not observed with regard to the device of the present invention. By the way, if all the clearances are set to 80 μm, the friction loss can be further reduced, however, it has been confirmed that the practical utility is lost due to the occurrence of noises. The clearance ratio is generally set to 4/10000 to 10/10000 in the prior art, however, according to the above experiments, the clearance ratios of the crankshaft bearings 4a, 4b and 4c are 10/10000, 7/10000 and 14/10000, respectively, and the ratio of the crankshaft bearing 4c is quite large.

Figure 11:
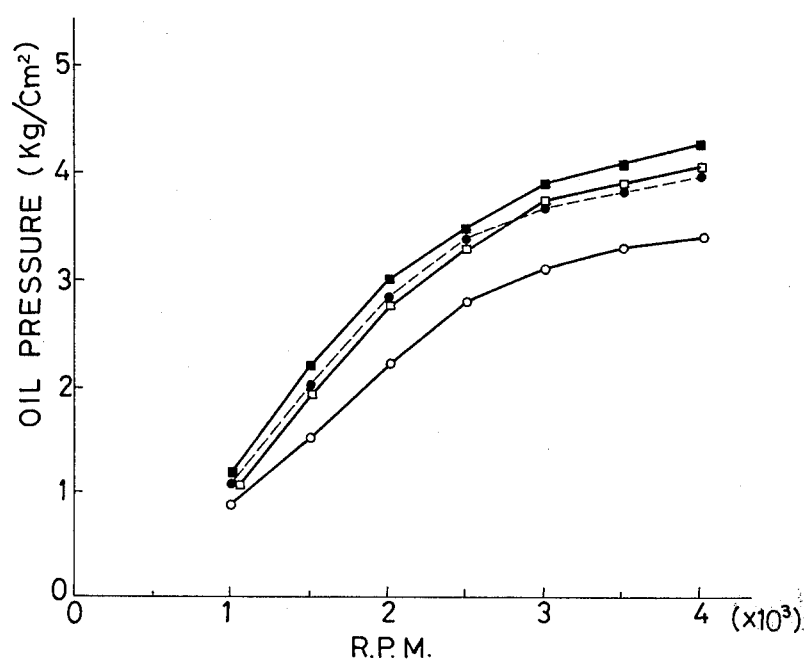
FIG. 11 is a diagram showing the results of the tests for the countermeasure to oil pressure lowering.

Shown in FIG. 11 are the results of engine motoring tests for the effects of countermeasure to oil pressure lowering in the crankshaft bearings having varied clearance. The test conditions are indicated in the following Table 3. The symbols in FIG. 11 for the bearings are indicated in the following Table 4, in which "one side groove" means that the lubricant oil groove 12 is formed in only one of the pair of semicircular sliding bearing halves 4A and 4B of the crankshaft bearing, and "central click" means the click which is formed at the central portion in the direction of the bearing width of the crankshaft bearing.

TABLE 3

| | |
|---|---|
| Type of engine | 4 cylinders, 1600 cc |
| | Crankshaft: 58φ |
| | Connecting rod shaft: 48φ |
| Test device | All up machine except ignition plugs |
| Supplied oil temperature | 100 ± 2° C. |
| | (Measured at the inlet of main hole) |
| Kind of oil | SAE 10W-30 |
| Oil pressure | Measured at the inlet of main hole |

TABLE 4

| Symbol | Bearing | Width of bearing (mm) | Oil clearance (μm) | Countermeasure to lowering of oil pressure |
|---|---|---|---|---|
| ● | Conventional | 20.8 | 35-45 | — |
| ○ | This invention | 20.8 | 4a:60<br>4b:40<br>4c:80<br>4d:40<br>4e:60 | — |
| □ | This invention | " | 4a:60<br>4b:40<br>4c:80<br>4d:40<br>4e:60 | One side groove |
| ■ | This invention | " | 4a:60<br>4b:40<br>4c:80<br>4d:40<br>4e:60 | Central click<br>One side groove |

As clearly understood from FIG. 11, when the oil clearances are varied and some of them are enlarged without changing the conventional lubricating system, a lowering of the oil pressure is caused to occur. However, when the above-described countermeasure to oil pressure lowering is taken, a quite good balance of oil supply like the conventional bearings can be maintained.

Figure 12:
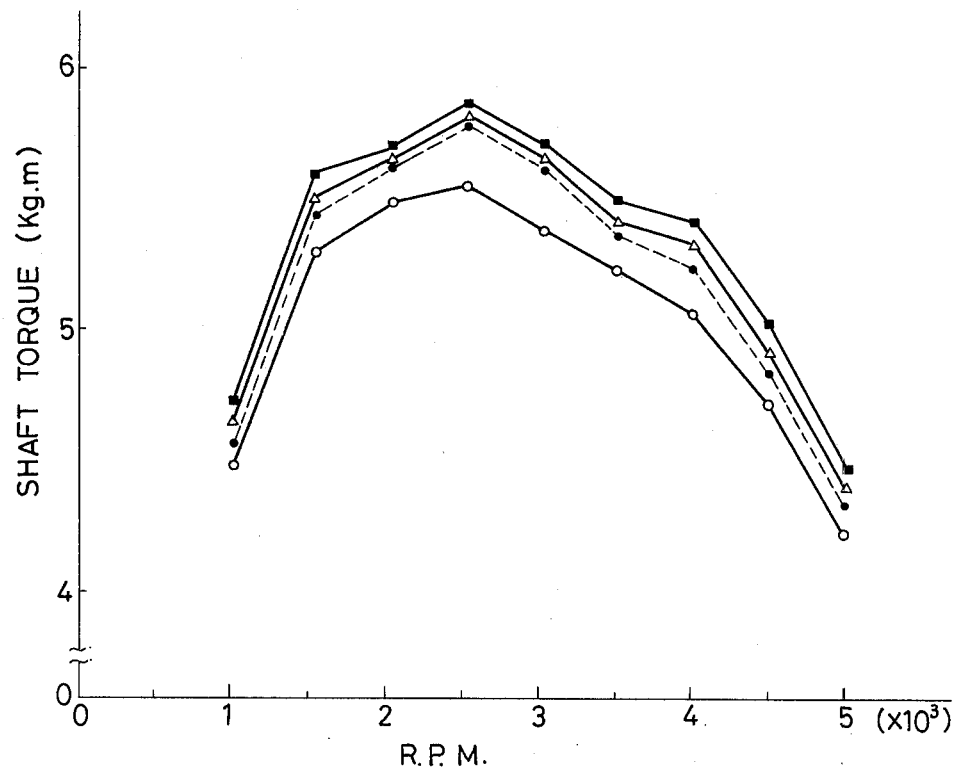
FIG. 12 and 13 are diagrams showing the effects of enlargement of oil reliefs of connecting rod bearings.
Figure 13:
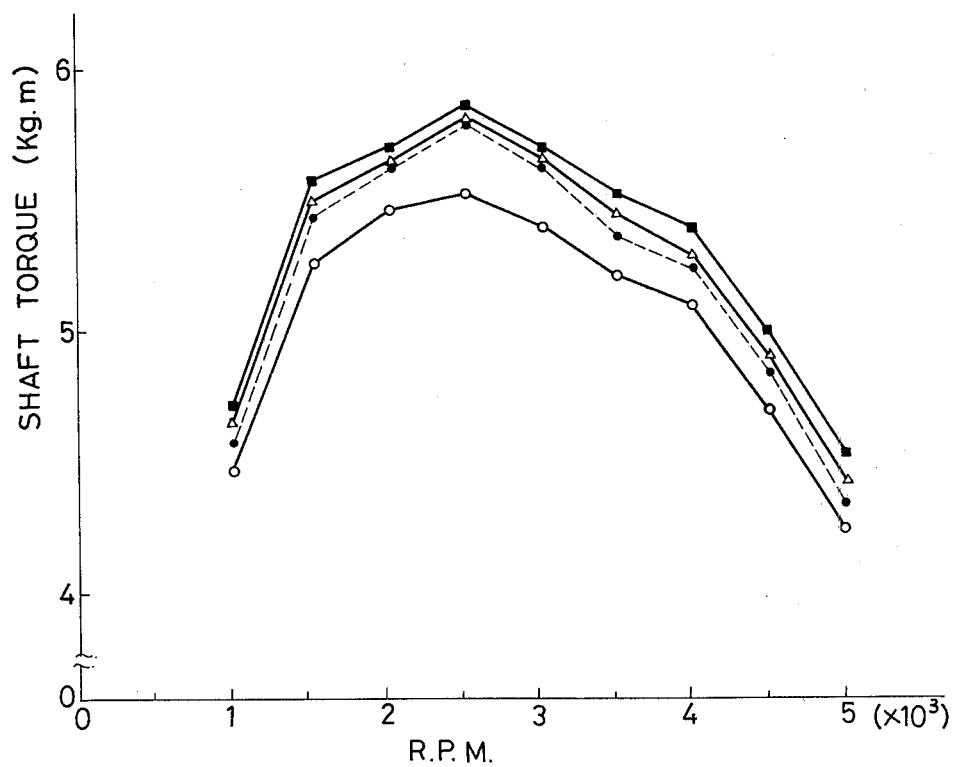

In the above experiments, the oil reliefs of the connecting rods are not enlarged. The oil reliefs of the connecting rod bearings are enlarged in the following experiments. The results shown in FIGS. 12 and 13 are those of real engine firing tests (−360 mmHg partial load). The test conditions are indicated in the following Table 5. The bearings used in the tests shown in FIG. 12 are indicated in the following Table 6 and those used in the tests shown in FIG. 13 are indicated in the following Table 7. The terms, "central click" of the crankshaft bearing and "one side groove" are as defined above and the term "central click" of connecting rod means that the click for positioning is formed at the central portion of a sliding bearing having no lubricant oil groove.

TABLE 5

| | |
|---|---|
| Type of engine | 4 cylinders, 1800 cc |
| | Crankshaft: 58φ |
| | Connecting rod shaft: 48φ |
| Test device | Engine Bench test |
| | (Loads are applied by a dynamometer) |
| Supplied oil temperature | 80 ± 2.5° C. |
| | (Measured at the inlet of main hole) |
| Oil supply | Supplied from the oil pump of engine |
| Kind of Oil | SAE Low-30 |

TABLE 6

| Symbol | Bearing | Width of bearing (mm) | Oil clearance (μm) | | Oil relief (μm) | | Countermeasure to lowering of oil pressure |
|---|---|---|---|---|---|---|---|
| ● | Conventional Crankshaft b. | 20.8 | 35–45 | | 10–15 | | — |
|  | Con. rod b. | 20.0 | 35–45 | | 10–15 | | — |
| ○ | This invention Crankshaft b. | 20.8 | (*1) 4a: 50 4b: 35 4c: 60 4d: 35 4e: 50 | 4a 4b 4c 4d 4e | (*2) 30–35 | | — |
|  | Con. rod b. | 20.0 | 35–45 | | 30–35 | | — |
| ■ | This invention Crankshaft b. | 20.8 | Same as (*1) | | Same as (*2) | | Central click One side groove |
|  | Con. rod b. | 20.0 | 35–45 | | 30–35 | | Central click |
| △ | This invention Crankshaft b. | 20.8 | Same as (*1) | | Same as (*2) | | Central click One side groove |
|  | Con. rod b. | 20.0 | 35–45 | | 10–15 | | Central click |

TABLE 7

| Symbol | Bearing | Width of bearing (mm) | Oil clearance (μm) | | Oil relief (μm) | | Countermeasure to lowering of oil pressure |
|---|---|---|---|---|---|---|---|
| ● | Conventional Crankshaft b. | 20.8 | 35–45 | | 10–15 | | — |
|  | Con. rod b. | 20.0 | 35–45 | | 10–15 | | — |
| ○ | This invention Crankshaft b. | 20.8 | (*1) 4a: 60 4b: 40 4c: 80 | 4a 4c 4e | (*2) 10–15 | | — |
|  |  |  | 4d: 40 4e: 60 | 4b 4d | 30–35 | | |
| ■ | Cor. rod b. This invention Crankshaft b. | 20.0 20.8 | 35–45 Same as (*1) | | 30–35 Same as (*2) | | — Central click One side groove |
|  | Con. rod b. | 20.0 | 35–45 | | 30–35 | | Central click |
| △ | This invention Crankshaft b. | 20.8 | Same as (*1) | | Same as (*2) | | Central click One side groove |
|  | Con. rod b. | 20.0 | 35–45 | | 10–15 | | Central click |

The following fact can be understood from the test results shown in FIGS. 12 and 13. That is, when the bearing device of the present invention is used without the countermeasure to oil pressure lowering in an internal combustion engine having the conventional lubricating system, a lowering of shaft torque is observed as compared with the conventional bearing device. However, when the countermeasure to the oil pressure lowering is taken in the bearing device of the present invention, higher torques are obtained as compared with the conventional bearing device. From this fact, it is understood that the above countermeasure to the oil pressure lowering is effective and the friction loss can be reduced with maintaining the balance of oil supply to the respective sliding bearings. Further, in the sliding bearings of the present invention having no countermeasure to the oil pressure lowering, when the lubricating system is changed so as to supply the proper quantity of the lubricant oil, the friction loss can also be reduced successfully without the countermeasure to the oil pressure lowering.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. In a bearing assembly of an internal combustion engine in which the crankshaft thereof is supported by said bearing assembly at three or more points by means of crankshaft bearings, the improvement in said bearing assembly which is characterized in that the clearances between said crankshaft and said crankshaft bearings are varied in accordance with the intensities of the impact loads which are exerted on the respective crankshaft bearings.

2. The bearing assembly of an internal combustion engine as claimed in claim 1, wherein said crankshaft bearings are each comprised of a pair of semicylindrical bearing halves and wherein at least in the crankshaft bearing which has a relatively small clearance, the difference between the clearance from the crankshaft measured at the central crown portion of a crankshaft bearing half and the clearance from the crankshaft measured at a point about 6 to 10 mm away from the circumferential end of said crankshaft bearing half is from 16 to 80 μm.

3. The bearing assembly of an internal combustion engine as claimed in claim 2, in which the crankshaft has crankpins and including connecting rod bearings on the crankpins, said connecting rod bearings each being comprised of a pair of semicylindrical bearing halves, and wherein for each associated crankpin and connecting rod bearing the difference between the clearance from the crankpin measured at the central crown portion of a connecting rod bearing half of its associated connecting rod bearing and the clearance from said crankpin measured at the end portion of said connecting rod bearing half is 16 to 80 μm.

4. The bearing assembly of an internal combustion engine as claimed in claim 1, in which the crankshaft has crankpins and including connecting rod bearings on the crankpins, said connecting rod bearings each being comprised of a pair of semicylindrical bearing halves, and wherein for each associated crankpin and connecting rod bearing the difference between the clearance from the crankpin measured at the central crown portion of a connecting rod bearing half of its associated connecting rod bearing and the clearance from said crankpin measured at the end portion of said connecting rod bearing half is 16 to 80 μm.

5. The bearing assembly of an internal combustion engine as claimed in claim 1, claim 2, claim 4 or claim 3, wherein said crankshaft bearings are each comprised of a pair of semicylindrical bearing halves and wherein both of the bearing halves of at least the bearing that has a relatively large clearance are each provided with a lubricant oil groove and a positioning click formed on the backside of said lubricant oil groove.

6. The bearing assembly of an internal combustion engine as claimed in claim 5 wherein said lubricant oil grooves are located in the axially central portions of said bearing halves.

7. The bearing assembly of an internal combustion engine as claimed in claim 1, claim 2, claim 4 or claim 3, wherein said crankshaft bearings are each comprised of a pair of semicylindrical bearing halves and wherein only one of said bearing halves of at least the bearing that has a relatively large clearance is provided with a lubricant oil groove, the other of said bearing halves being free of a lubricant oil groove.

8. The bearing assembly of an internal combustion engine as claimed in claim 7, wherein a positioning click is formed on the backside of said lubricant oil groove.

9. The bearing assembly of an internal combustion engine as claimed in claim 8 wherein a second positioning click is formed on the other bearing half having no lubricant oil groove, said positioning clicks being disposed symmetrically with regard to the axial center of said bearing.

10. The bearing assembly of an internal combustion engine as claimed in claim 9 wherein said lubricant oil groove is disposed in the axially central portion of said bearing.

11. The bearing assembly of an internal combustion engine as claimed in claim 8 wherein said lubricant oil groove is disposed in the axially central portion of said bearing.

12. The bearing assembly of an internal combustion engine as claimed in claim 7, wherein a positioning click is formed in said one bearing half in a position which is axially offset from the position of said lubricant oil groove.

13. The bearing assembly of an internal combustion engine as claimed in claim 12 wherein a second positioning click is formed on the other bearing half having no lubricant oil groove, said positioning clicks being disposed symmetrically with regard to the axial center of said bearing.

14. The bearing assembly of an internal combustion engine as claimed in claim 13 wherein said lubricant oil groove is disposed in the axially central portion of said bearing.

15. The bearing assembly of an internal combustion engine as claimed in claim 12 wherein said lubricant oil groove is disposed in the axially central portion of said bearing.

16. The bearing assembly of an internal combustion engine as claimed in claim 7, wherein a positioning click is formed on said one bearing half having said lubricant oil groove and a second positioning click is formed on the other bearing half having no lubricant oil groove, said positioning clicks being disposed symmetrically with regard to the axial center of said bearing.

17. The bearing assembly of an internal combustion engine as claimed in claim 7, wherein said lubricant oil groove is disposed in the axially central portion of said bearing.

18. The bearing assembly of an internal combustion engine as claimed in claim 4 or claim 3, wherein said connecting rod bearings are each comprised of a pair of semicylindrical bearing halves and wherein both of said bearing halves are not provided with lubricant oil grooves and both of said bearing halves have positioning clicks disposed in the axially central portion of said bearing.

* * * * *